Jan. 14, 1969
W. K. McGINTY ETAL
3,422,261
LIGHTING FIXTURE
Filed Nov. 7, 1966
Sheet 1 of 3
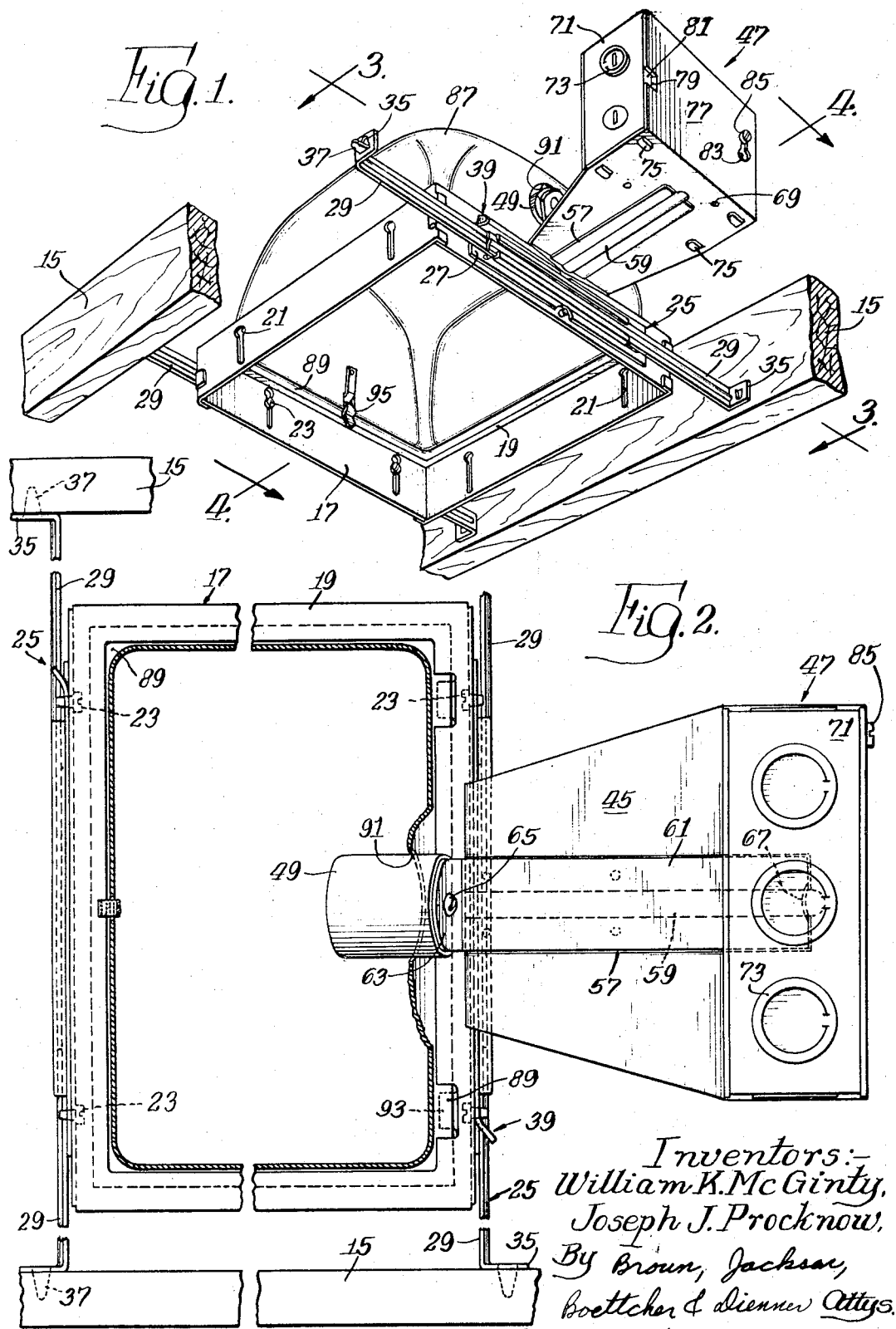
Inventors:—
William K. McGinty,
Joseph J. Procknow,
By Brown, Jackson,
Boettcher & Dienner Attys.

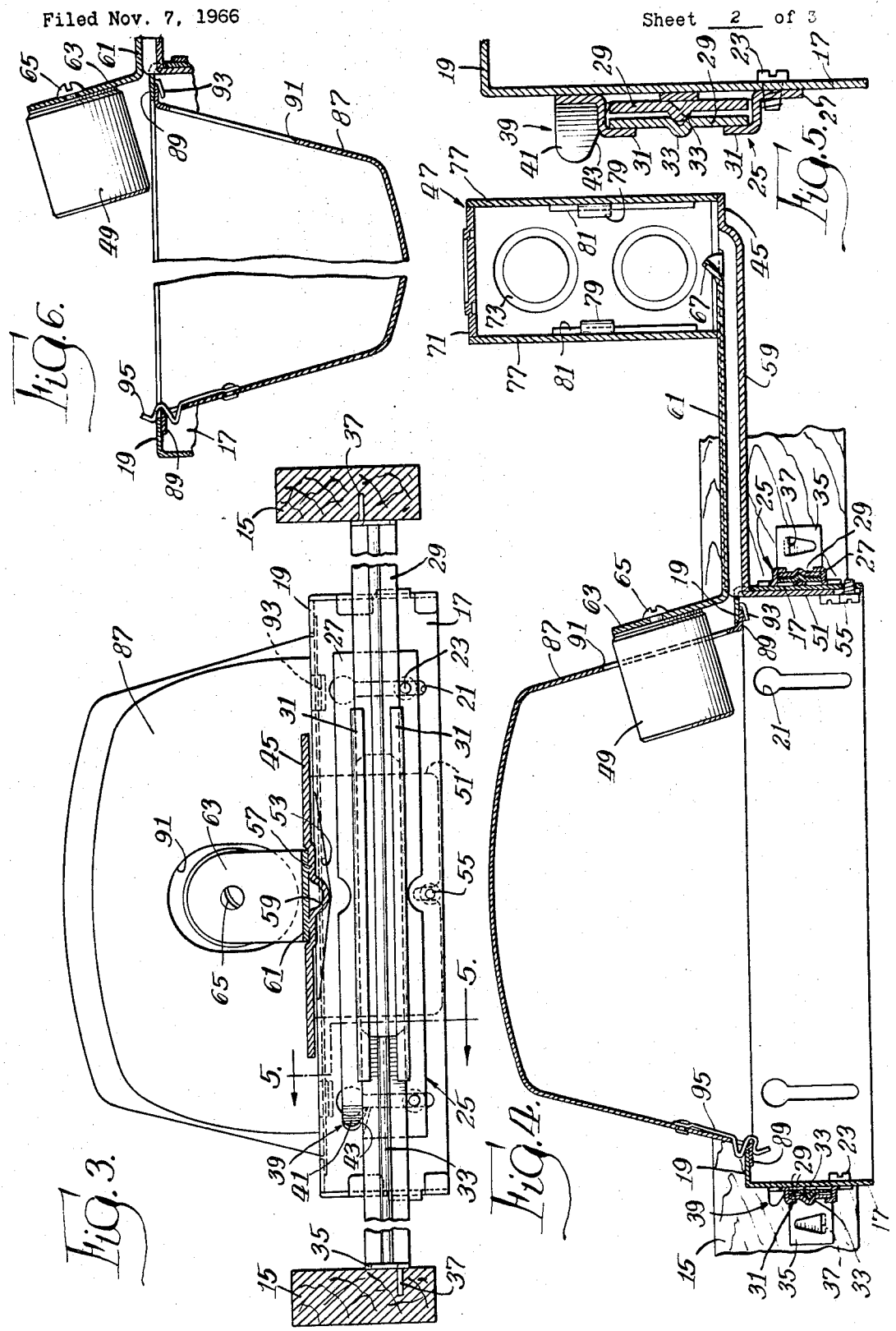

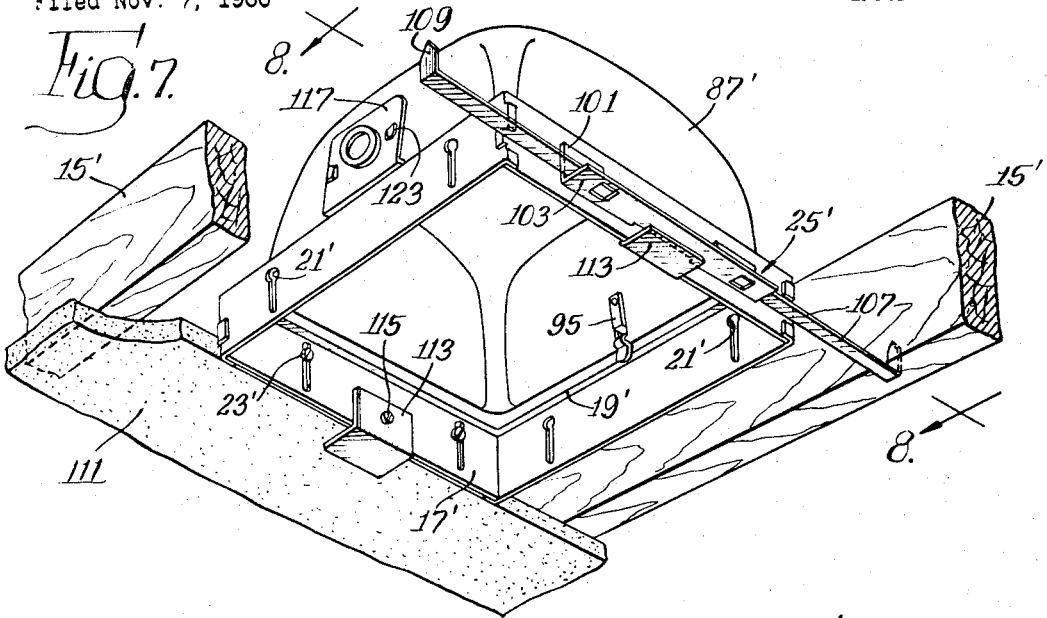
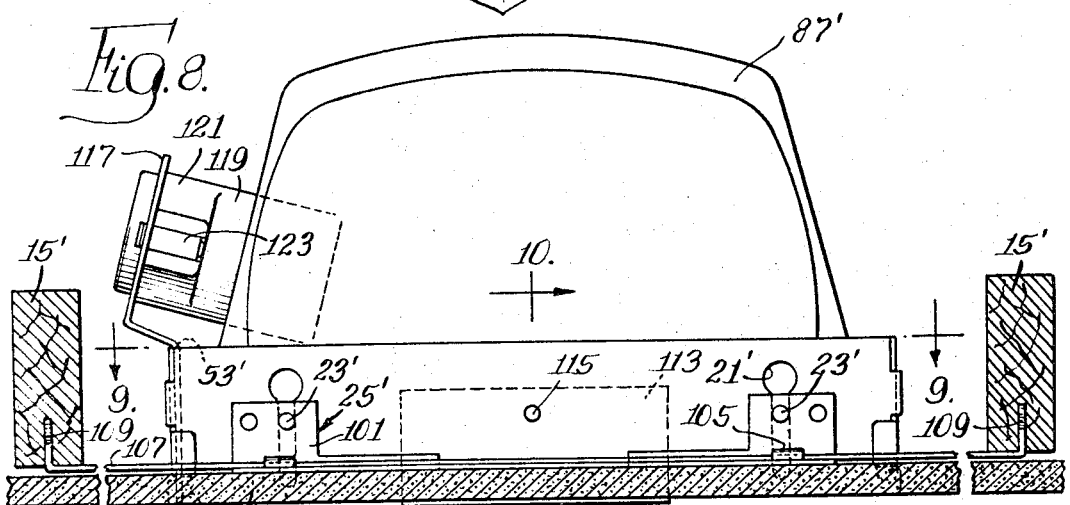
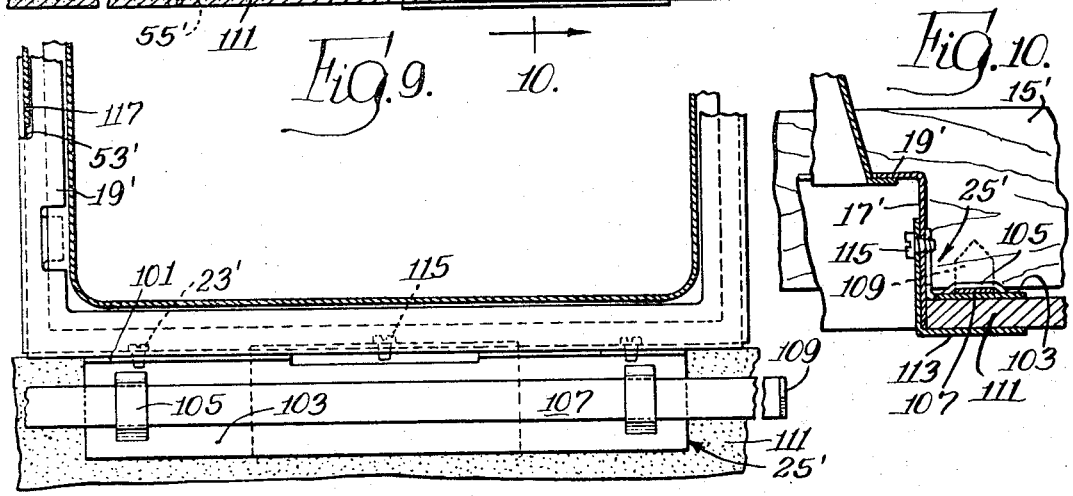
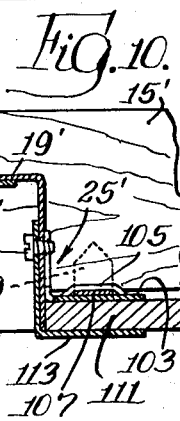

3,422,261
Patented Jan. 14, 1969

3,422,261
LIGHTING FIXTURE
William K. McGinty, Fort Atkinson, and Joseph J. Procknow, Jefferson, Wis., assignors to Thomas Industries Inc., Fort Atkinson, Wis., a corporation of Delaware
Filed Nov. 7, 1966, Ser. No. 592,468
U.S. Cl. 240—78                              13 Claims
Int. Cl. F21v 21/02; F21v 21/04

ABSTRACT OF THE DISCLOSURE

A recessed lighting fixture including a frame, a snap-in reflector invertibly mountable on the frame, a splice box-socket assembly accessible through the fixture, and adjustable hangars. The adjustable hangers to secure the fixture between wall or ceiling joists in a manner to allow selective positioning of the fixture between the supporting joists.

---

The present invention relates in general to lighting fixtures and in particular to a lighting fixture which is adapted to be recessed in a building wall, ceiling or the like and which is readily affixed to the wall, ceiling or the like with a minimum amount of manual labor.

In many new and remodeled building structures, recessed lighting fixtures are built into the walls, ceilings or the like. Such installations, while architecturally pleasing and easily maintainable from a housekeeping point of view, often require difficult electrical and carpentry operations to provide a fixture which is flush with the wall, ceiling or the like when finished. Many fixtures require that the joists to which they are secured be notched. Such notching operation must frequently be done with hand tools in difficult-to-reach locations. Further many installations are made in the dead air space between ceiling joists which are already covered by flooring from above, so that all the work must be done from below. When the fixtures being installed are of the type carrying their own splice box, their installation is often limited because the splice box, as it extends from the light fixture, must be installed substantially parallel with the ceiling joists. This, of necessity, introduces installation difficulties. In some cases where hanger brackets are provided, reinstallation or at least reorientation is required because the fixture has shifted along the brackets prior to closing in the ceiling. Many splice boxes which are attached to fixtures carry the wiring therein closely adjacent their walls. When such fixtures are electrically operated, the walls of the splice box function as a heat sink for the heat generated in the wires and the operating temperature of the entire fixture rises appreciably by heat conduction and convection therefrom. Such increased temperature, particularly when maintained for a long period of time, becomes particularly dangerous and a fire hazard when the fixture is fully enclosed by the ceiling or wall.

It is thus an object of the present invention to provide a lighting fixture which is easily recessable in a building wall, ceiling or the like with a minimum expenditure of manual labor and use of tools.

Another object of the invention is to provide a lighting fixture employing hanging structures which require no notching of the joists to which the fixture is being attached.

It is a feature of the present invention that the lighting fixture can be installed in the dead air space between ceiling or wall joists either parallel or perpendicular to the joists themselves.

Yet another feature of the present invention is that a snap-in reflector allows fast and easy access to a splice box carried by the fixture and closely adjacent thereto.

An additional feature of the present invention is that the fixture hangers are easily adjustable from inside the fixture to compensate for different wall or ceiling thicknesses so that the fixture when assembled is flush with the ceiling opening.

Another feature of the present invention is that the lighting fixture is freely adjustable along the mounting hangers to any desired position between the joists.

A further object of the present invention is to provide novel means for locking the lighting fixture to the mounting hangers to prevent accidental shifting of the fixture subsequent to mounting and prior to closing in the ceiling.

An additional feature of the present invention is that it is equally well adapted for use with either plaster or ceiling tile construction.

A further object of the present invention is to provide an outlet box having a removable cover on both the front and back and which box can be removed from the fixture for easy accessibility.

It is an additoinal feature of the present invention that the reflector can be snapped into the fixture in an inverted position to keep the fixture clean while the ceiling is being finished.

It is yet another object of the present invention to provide an integral enclosed wireway from a lamp socket to the junction box.

It is a further object of the present invention to provide means for spacing the wire leading into the junction box from the walls thereof so as to disperse any heat from the wires into the air space within the junction box.

In the accomplishment of the aforementioned objects and features, the present invention contemplates a recessible lighting fixture employing hanger members which are adapted to be attached to the building structure with a minimum amount of manual labor and a minimum number of hand operated tools and yet are easily adjustable from inside the fixture for registering the fixture with respect to the ceiling or wall opening. Lock means cooperating with the hangers prevent the movement of the fixture along the hangers once it is located and thus prevent the housing from shifting prior to closing in the ceiling. This fixture also carries a bracket on which is installed a splice box having easily removable covers. The bracket comprises a trough integrally formed thereof which, upon being suitably covered, defines an integral rigid wireway extending from the fixture to well inside the splice box. A snap-in reflector is invertible to preserve the cleanliness of the fixture during installation, yet also provides for maximum light efficiency when positioned operably within the fixture. The simple removal of the reflector further provides quick and easy access to the splice box for wiring, installation, and repair. Easily attachable brackets partially support ceiling or wall tiles abutting the fixture sidewalls if such ceiling or wall construction is being employed.

When the fixture is recessed into the building structure, it will be flush with the ceiling or wall itself and yet carry its own splice box closely adjacent thereto although hidden from view. Such splice box will be easily accessible for repairs through the fixture itself and in its operating state runs less hot and is thus safer.

Other and further objects, as well as features and advantages, of the present invention will be at once apparent or will become so when considering the following description of an illustrated embodiment thereof, given for the purposes of disclosure and taken in conjunction with the accompanying drawings in which like character references designate like parts throughout the several views.

In the drawings:

FIGURE 1 is a perspective view of a recessed lighting fixture incorporating the principles of the present invention and attached to ceiling or wall joists, with portions being broken away to illustrate the invention;

FIGURE 2 is an enlarged foreshortened top plan view of the lighting fixture embodying the invention shown in FIGURE 1, with the top portion of the reflector being broken away and shown in section;

FIGURE 3 is a vertical sectional view taken along the line 3—3 of FIGURE 1, looking in the direction indicated by the arrows;

FIGURE 4 is a vertical sectional view taken along the line 4—4 of FIGURE 1, looking in the direction indicated by the arrows;

FIGURE 5 is an enlarged vertical sectional view, taken substantially along the line 5—5 of FIGURE 3, looking in the direction indicated by the arrows;

FIGURE 6 is a foreshortened vertical sectional view corresponding generally to FIGURE 4, but illustrating the reflector inverted in the housing;

FIGURE 7 is a perspective view of another embodiment of the present invention;

FIGURE 8 is a foreshortened sectional view, taken substantially along the line 8—8 of FIGURE 7, looking in the direction indicated by the arrows;

FIGURE 9 is a fragmentary view, taken substantially along the line 9—9 of FIGURE 8, looking in the direction indicated by the arrows; and FIGURE 10 is a vertical sectional view, taken substantially along the line 10—10 of FIGURE 8, looking in the direction indicated by the arrows.

Referring now to the several figures and first to FIGURE 1, an illustrated embodiment of a recessed lighting fixture comprising the present invention is shown installed in the dead air space between an adjacent pair of wall or ceiling joists 15. A regid plaster frame 17 having a generally square shape is formed of interlocking sheet metal sides and includes an inwardly turned flange 19 along the peripheral edge of the frame 17. The side walls are joined at their abutting corners by connecting means, such as interlocking tabs or spot welding, and define the frame which is open at the top and bottom.

Keyhole openings 21 are punched into the sides of the frame 17 to receive fastener means, such as screws 23, which connect means for attaching the frame to the building wall, shown generally at 25.

As shown in FIGURES 3 and 5, the attaching means 25 includes a mounting member 27 and a pair of sliding adjustable bar hangers 29 supported thereby. The mounting member and the sliding adjustable bar hangers are formed of rigid sheet metal so as to support the weight of the fixture carried thereon. The hangers 29 are carried in a pair of parallel tracks defined by the offset flanes 31 of the mounting member 27. Thus, the bar hangers 29 are held and guided in the mounting member 27 by the parallel flange 31 and move in parallel adjacent paths of travel. Longitudinal shallow ribs 33 formed integrally of the hanger material cooperate for increasing lateral friction forces therebetween in that the exterior surface of the rib of one bar hanger fits into the interior surface of the rib of the adjacent bar hanger. Such engagement accommodates longitudinal movement of the hangers with respect to one another on parallel axes and yet prevents lateral movement of the hangers with respect to one another.

Means are provided at the outer end of each of the bar hangers for securing the fixture to the wall or ceiling joists 15. In the embodiment shown in FIGURE 1 a flange 35 at an outer end of the hangers 29 and a lanced tab 37 formed therefrom. By individually hitting the flanges with a hammer, the hangers are longitudinally spread apart and the tabs 37 are simultaneously driven into the joists to securely hold the lighting fixture therebetween. As will be seen from FIGURE 3, the mounting member 27 is adjustable along the keyhole openings 21 to provide for aligning the outer open face of the plaster frame with respect to the joists 15 of any wall covering surface, such as plaster (not shown), which may be affixed to the joists in known manner.

Novel means for locking the lighting fixture along the bar hangers 29 is provided at 39. The locking means 39 comprises a bendable tongue 41 integrally formed of the mounting member 27 and having a cam surface 43 which angularly intersects a plane defined by the upper edges of the hangers 29. Once the fixture has been properly positioned longitudinally along the hangers 29, the tongue is bent outwardly away from the plane of the mounting member 27 toward the hangers 29, shown in FIGURE 5. As the camming surface 43 engages the upper surface of the adjacent hanger and frictionally engages the same, the camming action moves the engaged hanger against the other hanger and prevents further movement of the fixture along the hangers and effectively locks the fixture in a chosen position therealong. Thus, the locking means forces the bars together, thereby increasing the frictional resistance therebetween.

The frame 17 also carries a bracket 45 which, in turn, carries a splice box 47 and lamp socket 49 adjacent opposite ends thereof. The bracket 45, which is generally L-shaped and formed of rigid sheet material, is attached to the frame 17 by extending a leg portion 51 thereof through an aperature 53 formed in one side of the frame 17. The leg portion 51 (FIGURE 4) is attached to the side of the frame by fastener means, such as screw 55.

Referring to FIGURE 3, the bracket 45 includes a longitudinally extending depressed portion 57 which has a trough 59 integrally formed centrally thereof. Both the depressed portion 57 and the trough 59 are stamped outwardly from the plane of the bracket and when the bracket is mounted to the frame extend substantially away from the plaster frame 17 of the fixture toward an outer end of the bracket. Secured in the depressed portion 57, as by welding, is the body portion of a socket mount 61. With the mount 61 thus covering the trough 59, a wireway is defined through which electrical wiring (not shown) may be prewired and attached to the socket 49 in a known manner. The socket is attached to a projecting flange 63 at one end of the socket mount by fastening means, such as screw 65. The mount 61 is substantially as long as the trough and forms openings into the wireway at each end thereof so that the wire may be threaded into and out of the wireway. An upwardly curved lip 67 (FIGURE 4) formed of the mount 61 adjacent the end which is spaced from the plaster frame provides a smooth curved surface against which wire leading from the wireway may lie. The lip inhibits wearing of the protective coating on the wire and reduces the possibility of shorts.

The bracket 45 includes holes 69 (FIGURE 1) in which a third wire may be fastened, as with a screw, for grounding.

The splice box 47, which includes an opening in at least one side thereof, is mounted on the bracket with the open side surrounding the opening at the outer end of the wireway as shown in FIGURE 4. In this way, wires entering the splice box are spaced from the walls of the box and much of the heat from the wires is dispersed into the dead air space within the box. Thus, the walls of the box absorb less heat generated by the wires during electrical operation of the fixture and do not act as a sink for the heat.

In the embodiment shown, the splice box is formed of generally U-shaped member 71 which defines a top and two sides for the box. A plurality of knock-outs 73 are formed therein for wire connections in the known manner. The lower edges of the sides are securely attached to the bracket 45 by projecting tabs 75 (FIGURE 1) extending through openings in the bracket 45 which are clinched thereagainst. Cover portions 77 are attached to the member 71 by an integral lanced tab 79 formed thereof which hingedly engages a flange 81 formed of the U-shaped member. Keyhole slots 83 (one shown in FIGURE 1) punched in the cover 77 are engaged by fastener means 85 to secure the cover 77 to the member 71 so as to define the splice box. In this way, the interior of the box is easily accessible when wiring connections are necessary.

A one-piece concave reflector 87 (FIGURE 1) is formed of aluminum stock in a shape which is substantially parabolic. The reflector has a generally outwardly extending flange 89 adjacent the base thereof and includes an aperture 91 sized and positioned to fit around the socket 49 when the reflector is mounted in the fixture. The inner surface of the reflector is polished to reflect light from a lamp (not shown) mounted in the socket 49. The aluminum metal helps to dissipate some of the heat from the lamp by radiation from the reflector surface. The reflector is assembled within the plaster flange by engaging a portion of the flange 89 of the reflector in a pair of tabs 93 (FIGURE 4) which have been lanced from the flange 19. The tabs 93 cooperate with the flange 89 to define hinge means about which the reflector is pivoted into its operative position. When in its operative position, the socket 49 extends into the reflector 87 and the flanges 19 and 89 lie adjacent each other. A spring clip 95 attached to the reflector, is contoured to engage the upper surface of the flange 19 and hold the reflector within the fixture.

FIGURE 6 illustrates the feature of the invention wherein the reflector 87 is hung from the fixture in an inverted position to keep the fixture clean during plastering and other dirty or dusty building operations. A portion of the flange 89 is hinged in the prongs 93 and the reflector 87 is swung to a position wherein the flanges 89 and 19 lie adjacent each other, at which time the spring clip 95 locks the reflector in place. The spring clip 95 is contoured to provide a second surface which engages the upper surface of the flange 19 to hold the reflector in such inverted position.

While the illustrated embodiment shows the bracket carrying the splice box and the socket mounted parallelly to the joists 15, the lighting fixture may be rotated 90°, if the joists are sufficiently spaced, so that the bracket is in a perpendicular relationship to the joists. For this purpose, each of the sides of the plaster frame 17 is provided with the keyhole openings 21 so that the mountings 27 may be easily reoriented for such aforementioned perpendicular positionment.

A modified embodiment of our present invention is shown in FIGURES 7–10. Primed reference numerals have been used to indicate those parts that are the same as or similar to the parts illustrated in FIGURES 1–6. In FIGURE 7, mounting brackets 101 are attached along keyhole slots 21' by fastener means 23'. Each mounting bracket 101 includes a lateral flange 103 from which integral offset bands 105 have been lanced (FIGURES 10) to define guideways. A one-piece bar hanger 107 is carried by the flange 103 under the guideways 105. Flanged tangs 109, integrally formed of the outer ends of the hanger bar 107, are pointed so that they may be easily driven into the undersides of the joists 15' with a hammer. In this way, the fixture is securely attached to the joists 15' and yet is adjustable lengthwise of the bar hangers 107 so as to be positionable relative to the adjacent joists in the dead air space therebetween.

In some form of building construction, ceiling or wall tile 111 is used to cover the joists and the dead air space therebetween. The present invention provides an L-shaped mounting angle 113 which is attachable to the plaster frame by fastener means 115 to provide a supporting surface for carrying the ceiling or wall tile 111. As shown in FIGURE 10, the mounting angle 113 is attached to the frame 17' so that the upper surface of the ceiling or wall tile 111 lies adjacent the lower surface of the flange 103 and is held tightly thereagainst by the mounting angle 113.

For many building structures, individual splice boxes are unnecessary for each separate fixture. In another illustrated embodiment of the present invention an upstanding socket mount or bracket 117 is attached to the plaster frame 17' through the aperture 53' formed in the frame and is fixed in an upright manner to the frame by fastener means 55'. A lamp socket 119 having ear portions 121 extending therefrom is attached to the socket mount 117. A pair of spring clips 123 are attached to the ear portions 121 and engage holes in the mount 117 to hold the socket 119 in a position where it extends through the reflector 87' and into the interior of the fixture.

Thus, the present invention provides a recessed lighting fixture comprising a plaster flange, a reflector, a splice box-socekt assembly, and simple means for affixing the fixture to building structural elements. The handing means are simply attachable and require no preparation of the structures to which they are attached. The fixture can be installed either with or across ceiling or wall joists, and are easily adjustable from inside the fixture for leveling the fixture with respect to different ceiling or wall covering thicknesses so as to make the installed fixture flush with the ceiling or wall opening. A lock means on the hanger prevents the housing from shifting from a chosen portion prior to closing in the ceiling. A snap-in reflector allows fast and easy access to an attached outlet box which can be removed from the housing for easier accessibility, particularly when non-rigid conduit is used.

From the above description, it will be apparent that all of the recited objects, advantages and features of the invention have been demonstrated as obtainable in a highly practical structure. It will further be understood that although the invention has been described with respect to a specific embodiment or embodiments thereof, we do not wish to be thereby limited, since various modifications of the invention are intended to be encompassed within its true spirit and scope as indicated by the appended claims.

We claim:

1. A lighting fixture comprising: a frame adapted to be recessed in a building wall, ceiling or the like, said frame being open on at least one side thereof; a socket mount attached to said frame; a lamp socket carried by said mount; a reflector secured to said frame independently of said socket mount; a pair of variable length hangers carried by said socket frame; and securing means on said hangers for attaching said frame to the building wall.

2. A lighting fixture comprising: a frame adapted to be recessed in a building wall, ceiling or the like, said frame being open on at least one side thereof; a socket mount attached to said frame; a lamp socket carried by said mount; a reflector secured to said frame independently of said socket mount; a pair of hangers carried by said socket frame, each of said hangers comprising a pair of bars movable in adjacent parallel paths for positioning the outer ends of said bars along the paths, said frame being adjustable along the bars between the outer ends thereof; and securing means on said hangers for attaching said frame to the building wall.

3. The lighting fixture as claimed in claim 2 further comprising locking means attached to said frame acting on said bars for effecting frictional engagement therebetween and restraining sliding movement of said frame along said bars.

4. The lighting fixture claimed in claim 1 wherein said socket mount has an integral leg portion extending into said frame and lying adjacent a vertical side wall of said frame.

5. A lighting fixture comprising a frame adapted to be recessed in a building wall, ceiling or the like, said frame being opened on at least one side thereof, a socket mount attached to said frame, a lamp socket carried by said mount, a pair of hangers carried by said frame, each of said hangers comprising a pair of bars movable in adjacent parallel paths for positioning the outer ends of said bars along the paths, said frame being adjustable along the bars between the outer ends thereof, securing means on said hangers for attaching said frame to the building wall, and locking means attached to said frame and acting on said bars for effecting frictional engagement therebetween and restraining sliding movement of said frame along said bars, said locking means comprising a tongue having a cam surface arranged for movement between a position where said cam surface is out of engagement with said bars and a position where said surface is effective to engage at least one of said bars and move it into frictional engagement against the adjacent bar.

6. A lighting fixture comprising a frame adapted to be recessed in a building wall, ceiling or the like, said frame having vertical side walls and being open on at least one side thereof, a socket mount having an integral leg portion attachably extending into said frame and lying adjacent a vertical side wall of said frame, a lamp socket carried by said mount, a pair of hangers carried by said frame, each of said hangers comprising a one-piece member, securing means on said hangers for attaching said frame to the building wall, said securing means including an integral flange with a tab formed adjacent each of the outer ends of said hangers, said frame being adjustable along said hangers between the outer ends thereof, a concave reflector, interengaging means on said reflector and said frame for removably securing said reflector between a position where an inside surface of said reflector is directed outwardly with respect to the open side of said frame and a position where an outside surface of said reflector is directed outwardly with respect to the open side of said frame, and a spring clip attached to said reflector operable from one of said positions and engageable from one of said positions with said frame to secure said reflector to said frame and substantially parallel to the opening therein.

7. A lighting fixture comprising a plaster frame adapted to be recessed in a building wall, ceiling or the like, said frame being open at the top and bottom thereof; a bracket mounted on said frame, said bracket having a trough integrally formed thereof and being stamped outwardly from the plane of said bracket, said trough extending away from the plaster frame toward an outer end of said bracket; a splice box having an opening in at least one side mounted on said bracket with said opening being positioned closely adjacent an outer end of said trough; a socket mount having a projecting flange at one end, said mount being attached to said bracket in registry with said trough to form a wireway with said mount being substantially as long as said trough to form an opening into the wireway at each end thereof; a lamp socket attached to said flange; a pair of variable length hangers carried by said frame, and securing means for mounting said fixture to the wall, ceiling or the like.

8. A lighting fixture comprising a plaster frame adapted to be recessed in a building wall, ceiling or the like, said frame being open at the top and bottom thereof; a bracket mounted on said frame, said bracket having a trough integrally formed thereof and being stamped outwardly from the plane of said bracket, said trough extending away from the plaster frame toward an outer end of said bracket; a splice box having an opening in at least one side mounted on said bracket with said opening being positioned closely adjacent an outer end portion of said trough; a socket mount having a projecting flange at one end, said mount being attached to said bracket in registry with said trough to form a wireway with said mount being substantially as long as said trough to form an opening into the wireway at each end thereof; a lamp socket attached to said flange; a pair of hangers carried by said frame, each of said hangers comprising a pair of bars movable in adjacent parallel paths for positioning the outer ends of said bars along the paths, and said frame being adjustable along said bars between the outer ends thereof; and securing means for mounting said fixture to the wall, ceiling or the like.

9. The lighting fixture as claimed in claim 8 further comprising locking means attached to said frame acting on said bars for effecting frictional engagement therebetween and restraining sliding movement of said frame along said bars.

10. The lighting fixture as claimed in claim 9 wherein said locking means comprises a tongue having a cam surface arranged for movement between a position where said cam surface is out of engagement with said bars and a position where said surface is effective to engage at least one of said bars and move it into frictional engagement against the adjacent bar.

11. The lighting fixture as claimed in claim 10 further comprising a concave reflector, interengaging means on said reflector and said frame for removably securing said reflector between a position where an inside surface of the reflector is directed outwardly with respect to the open side of said frame and a position where an outside surface of the reflector is directed outwardly with respect to the open side of said frame, and a spring clip attached to said reflector operable from one of said positions and engageable from one of said positions with said frame to secure said reflector to said frame and substantially parallel to the opening therein.

12. A lighting fixture comprising a frame adapted to be recessed in a building wall, ceiling or the like, said frame being open on at least one side thereof, a socket mount attached to said frame, a lamp socket carried by said mount, a pair of hangers carried by said frame, securing means on said hangers for attaching said frame to the building wall, a concave reflector, interengaging means on said reflector and said frame for removably securing said reflector between a position where an inside surface of said reflector is directed outwardly with respect to the open side of said frame and a position where an outside surface of said reflector is directed outwardly with respect to the open side of said frame, and a spring clip attached to said reflector operable from one of said positions and engageable from one of said positions with said frame to secure said reflector to said frame substantially parallel to the opening therein.

13. A lighting fixture comprising a frame adapted to be recessed between joists of a building wall, ceiling or the like, said frame being open on at least one side thereof, lamp socket support means attached to said frame, and bar hangers supported by said frame for selective retractable extension relative thereto, each of said bar hangers including an integral flange adjacent the outer end thereof, each of said integral flanges having tab means thereon adapted to fixedly engage the adjacent inboard surface of a joist in supporting relation therewith.

References Cited

UNITED STATES PATENTS

| | | | |
|---|---|---|---|
| 1,617,184 | 2/1927 | Spott | 248—343 |
| 2,569,518 | 10/1951 | Deutsch et al. | 240—2 |
| 2,717,955 | 9/1955 | Schwemmer et al. | 240—78 |
| 2,741,695 | 4/1956 | Schockett | 240—78 |
| 3,327,984 | 6/1967 | Rennie | 240—78 |
| 3,091,678 | 5/1963 | Papsdorf | 240—78 |

NORTON ANSHER, *Primary Examiner.*

WAYNE A. SIVERTSON, *Assistant Examiner.*